United States Patent
Kankarej et al.

(10) Patent No.: US 10,392,987 B2
(45) Date of Patent: Aug. 27, 2019

(54) ASSEMBLY AND METHODS FOR $NO_x$ REDUCING REAGENT DOSING WITH VARIABLE SPRAY ANGLE NOZZLE

(71) Applicant: Cummins Emission Solutions Inc., Columbus, IN (US)

(72) Inventors: Rajendra Ashok Kankarej, Pune (IN); Vinay Kumar Joshi, Pune (IN)

(73) Assignee: Cummins Emission Solutions Inc., Columbus, IN (US)

( * ) Notice: Subject to any disclaimer, the term of this patent is extended or adjusted under 35 U.S.C. 154(b) by 77 days.

(21) Appl. No.: 15/473,106

(22) Filed: Mar. 29, 2017

(65) Prior Publication Data

US 2018/0283247 A1    Oct. 4, 2018

(51) Int. Cl.
    *F01N 3/20*    (2006.01)

(52) U.S. Cl.
    CPC ........ *F01N 3/2066* (2013.01); *F01N 2610/02* (2013.01); *F01N 2610/146* (2013.01); *F01N 2610/1453* (2013.01); *F01N 2900/1812* (2013.01); *F01N 2900/1821* (2013.01); *Y02T 10/24* (2013.01); *Y02T 10/47* (2013.01)

(58) Field of Classification Search
    CPC combination set(s) only.
    See application file for complete search history.

(56) References Cited

U.S. PATENT DOCUMENTS

| | | | |
|---|---|---|---|
| 4,523,719 A | 6/1985 | Hofmann | |
| 6,189,618 B1 | 2/2001 | Beeman et al. | |
| 6,626,381 B2 | 9/2003 | Parrish | |
| 6,769,634 B2 | 8/2004 | Brenk et al. | |
| 7,152,396 B2 * | 12/2006 | Cheng | F01N 3/0814 60/286 |

(Continued)

FOREIGN PATENT DOCUMENTS

| | | |
|---|---|---|
| DE | 10 2006 035 431 B4 | 12/2008 |
| JP | 04-232375 | 8/1992 |
| WO | WO 03/040543 A1 | 5/2003 |

OTHER PUBLICATIONS

International Search Report and Written Opinion issued for PCT/US2018/024557, dated Jul. 20, 2018, 11 pages.

*Primary Examiner* — Binh Q Tran
(74) *Attorney, Agent, or Firm* — Foley & Lardner LLP

(57) ABSTRACT

In an assembly and methods for $NO_x$ reductant dosing with variable spray angle nozzle, according to various embodiments, a reductant dosage is calculated. A reductant delivery region in an exhaust stream area of an aftertreatment system and an actuation period may be specified. Based at least on the reductant delivery region and the actuation period, the reductant insertion assembly may be placed in a state for reductant delivery such that one of a first array of reductant insertion ports and a second array of reductant insertion ports is in an open position. The shape of the variable spray angle nozzle may define different levels. Different arrays of reductant delivery ports may have varying operating characteristics, such as diameter, number of ports, actuation time, and/or reagent delivery angle and may be activated based on reductant flow pressure and/or reductant flow velocity.

9 Claims, 7 Drawing Sheets

(56) References Cited

U.S. PATENT DOCUMENTS

| | | | |
|---|---|---|---|
| 8,549,842 B2 * | 10/2013 | Park | F01N 3/2066 |
| | | | 239/429 |
| 9,260,994 B2 * | 2/2016 | Reeves | F01N 3/00 |
| 2007/0101700 A1 * | 5/2007 | Masaki | B01F 3/04049 |
| | | | 60/286 |
| 2008/0148717 A1 * | 6/2008 | Ohshima | F01N 3/2066 |
| | | | 60/295 |
| 2011/0168808 A1 | 7/2011 | Mitch | |
| 2012/0317963 A1 * | 12/2012 | Hatta | B01F 3/04056 |
| | | | 60/299 |
| 2015/0121855 A1 | 5/2015 | Munnannur et al. | |
| 2016/0010610 A1 * | 1/2016 | Fujino | F02M 43/04 |
| | | | 123/445 |

* cited by examiner

ASSEMBLY AND METHODS FOR NO$_x$ REDUCING REAGENT DOSING WITH VARIABLE SPRAY ANGLE NOZZLE

TECHNICAL FIELD

The present application relates generally to the field of aftertreatment systems for internal combustion engines.

BACKGROUND

For internal combustion engines, such as diesel engines, nitrogen oxide (NO$_x$) compounds may be emitted in the exhaust. To reduce NO$_x$ emissions, a selective catalytic reduction (SCR) process may be implemented to convert the NO$_x$ compounds into more neutral compounds, such as diatomic nitrogen and water, with the aid of a catalyst and a reductant. The catalyst may be included in a catalyst chamber of an exhaust system, such as that of a vehicle or power generation unit. A reductant, such as anhydrous ammonia, aqueous ammonia, or urea may be typically introduced into the exhaust gas flow prior to the catalyst chamber. To introduce the reductant into the exhaust gas flow for the SCR process, the reductant is introduced through a dosing module (doser), which may spray the reductant into an exhaust pipe of the exhaust system upstream of the catalyst chamber. The SCR system may include one or more sensors to monitor conditions within the exhaust system.

SUMMARY

Implementations described herein relate to an assembly and methods for reagent (DEF, reductant) insertion, in particular a variable spray angle nozzle, wherein the spray angle and reagent dosing rate are varied by controlling the reductant to exit from specified reductant insertion ports at specified times.

One embodiment relates to a variable angle spray nozzle of a reductant insertion assembly in an exhaust aftertreatment system. The nozzle includes an outer shell defining a channel therethrough. The outer shell includes a first array of reductant insertion ports fluidly connected to the channel and a second array of reductant insertion ports fluidly connected to the channel. Each of the first array of reductant insertion ports releases reductant from the nozzle at a first angle that is different from a second angle at which each of the second array of reductant insertion ports releases the reductant from the nozzle. The shape of the nozzle may be conical. In some implementations, the shape of the nozzle is stepped conical. The shape may contain multiple levels and, if the shape is stepped conical, each step in the stepped conical shape may define a level. A first level includes the first array of reductant insertion ports and a second level includes the second array of reductant insertion ports. At least one first port of the first array of reductant insertion ports has a first diameter that is different from a second diameter of at least one second port of the second array of reductant insertion ports. In some implementations, the nozzle includes a first segment, a second segment inclusive of the outer shell, a reductant inlet, and a reductant outlet fluidly coupled to the reductant inlet via the channel. The first segment and the second segment may be equal in inner diameter. The second segment of the cylindrical housing includes a first tapered edge and a second edge, and the second segment of the cylindrical housing is fixedly coupled to the first segment along the second edge.

Another embodiment relates to a reductant insertion assembly, which includes a housing. The housing includes a first segment and a second segment. The second segment is inclusive of an outer shell and defines a channel therethrough. The outer shell includes a first array of reductant insertion ports fluidly connected to the channel and a second array of reductant insertion ports fluidly connected to the channel. Each of the first array of reductant insertion ports alternates between a first open position and a first closed position and each of the second array of reductant insertion ports alternates between a second open position and a second closed position. The housing includes a reductant inlet, a reductant outlet fluidly coupled to the reductant inlet via the channel, and an actuator disposed within the first segment of the housing. In some implementations, the reductant insertion assembly includes a stationary perforated plate positioned within the housing, a rotor positioned on the stationary perforated plate, and a stator positioned within the housing.

In some implementations, the reductant insertion assembly includes a first spray pathway defined by a plane comprising a longitudinal axis of the housing. The first spray pathway fluidly connects a first reductant insertion port in the first array of reductant insertion ports and the channel. The reductant insertion assembly may further include a second spray pathway defined by the plane comprising the longitudinal axis of the housing, the second spray pathway fluidly connecting a second reductant insertion port in the second array of reductant insertion ports and the channel. A first angle formed by the first spray pathway and the longitudinal axis is different from a second angle formed by the second spray pathway and the longitudinal axis. The reductant insertion assembly includes a reductant dosing controller. The reductant dosing controller includes an interface circuit for accessing an NO$_x$ conversion ratio, and a NO$_x$ dosing circuit. The NO$_x$ circuit performs the operations of calculating, based at least on the NO$_x$ conversion ratio, a reductant dosage; specifying a reductant delivery region in a diesel engine exhaust stream area of an aftertreatment system; specifying an actuation period; and, based at least on the reductant delivery region and the actuation period, directing the housing to open one of the first array of reductant insertion ports and the second array of reductant insertion ports. The NO$_x$ dosing circuit performs the operations of defining the reductant delivery region based on an electronic signal value encoding a performance parameter. The interface circuit performs the operations of receiving the performance parameter including a value representing a reductant flow pressure and receiving a pressure sensor input value from a pressure sensor disposed within a housing of the reductant dosing system. The NO$_x$ dosing circuit calculates the reductant delivery region based at least on the reductant flow pressure and the pressure sensor input value.

The NO$_x$ dosing circuit may, based at least on the reductant delivery region and the actuation period, calculate a first path along the first spray pathway, including selecting the first spray pathway from a plurality of first array pathways that fluidly connect a first reductant insertion port in the first array of reductant insertion ports and the channel. The NO$_x$ dosing circuit may, based at least on the reductant delivery region and the actuation period, calculate a second path along the second spray pathway, comprising selecting the second spray pathway from a plurality of second array pathways that fluidly connect a second reductant insertion port in the second array of reductant insertion ports and the channel. The reductant delivery region may comprise a first coverage area and a second coverage area, and the NO$_x$ dosing circuit may perform the operations of defining a first arrangement including the first spray pathway such that the first coverage area is defined at least by the first spray pathway, defining a second arrangement including the second spray pathway such that the second coverage area is defined at least by the second spray pathway, and directing a diesel exhaust aftertreatment system to activate the second arrangement subsequently to activating the first arrangement such that each port in the second spray pathway is opened after each port in the first spray pathway is opened. In some implementations, the $NO_x$ dosing circuit performs the operations of evaluating a width of one of the first array of reductant insertion ports and selecting one of the first array of reductant insertion ports for opening based at least on the width and on the specified penetration depth.

Another embodiment relates to a method, which includes receiving, by an interface circuit of a reductant dosing controller, a $NO_x$ conversion ratio. Based at least on the $NO_x$ conversion ratio, an $NO_x$ dosing circuit of the reductant dosing controller calculates a reductant dosage, specifies a reductant delivery region in a diesel engine exhaust stream area of an aftertreatment system and specifies an actuation period. Based at least on the reductant delivery region and the actuation period, the $NO_x$ dosing circuit directs a reductant dosing system having a first array of reductant insertion ports and a second array of reductant insertion ports to open one of the first array of reductant insertion ports and the second array of reductant insertion ports. In some implementations, the $NO_x$ dosing circuit of the reductant dosing controller effectuates rotary actuation of the reductant dosing system by engaging a rotor positioned on a stationary perforated plate. The stationary perforated plate is positioned within a housing of the reductant dosing system.

In some implementations, based at least on the reductant delivery region and the actuation period, a first path is calculated along a first spray pathway. The first spray pathway is selected from a plurality of first array pathways that fluidly connect a first reductant insertion port in the first array of reductant insertion ports and a channel defined through a housing. Based at least on the reductant delivery region and the actuation period, a second path is calculated along a second spray pathway. The second spray pathway is selected from a plurality of second array pathways that fluidly connect a second reductant insertion port in the second array of reductant insertion ports and the channel. The first path and the second path are defined such that the first path and the second path are each positioned on a plane comprising a longitudinal axis of the housing such that a first angle, formed by the first path and the longitudinal axis, is different from a second angle formed by the second path and the longitudinal axis.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, an assembly and methods for reductant insertion, in particular a variable spray angle nozzle, wherein the spray angle and reductant dosing rate are varied by controlling the reductant to exit from specified reductant insertion ports. The various concepts introduced above and discussed in greater detail below may be implemented in any of numerous ways, as the described concepts are not limited to any particular manner of implementation. Examples of specific implementations and applications are provided primarily for illustrative purposes.

1. Overview

Methods, apparatus, assemblies and/or systems are provided to improve certain performance characteristics of an aftertreatment system, including, for example, reagent dosing and spray angle in exhaust aftertreatment systems using a reductant. In particular, a nozzle assembly is electronically configured to deliver reductant at a variable spray angle, and one may use one group of spray ports at a time where a greater degree of precision is needed to control reductant deposits. A reductant delivery assembly may include a single-injection actuator comprising a single armature, needle, plate, and other components to streamline the process of manufacturing the assembly.

2. Overview of Aftertreatment System

Figure 1:
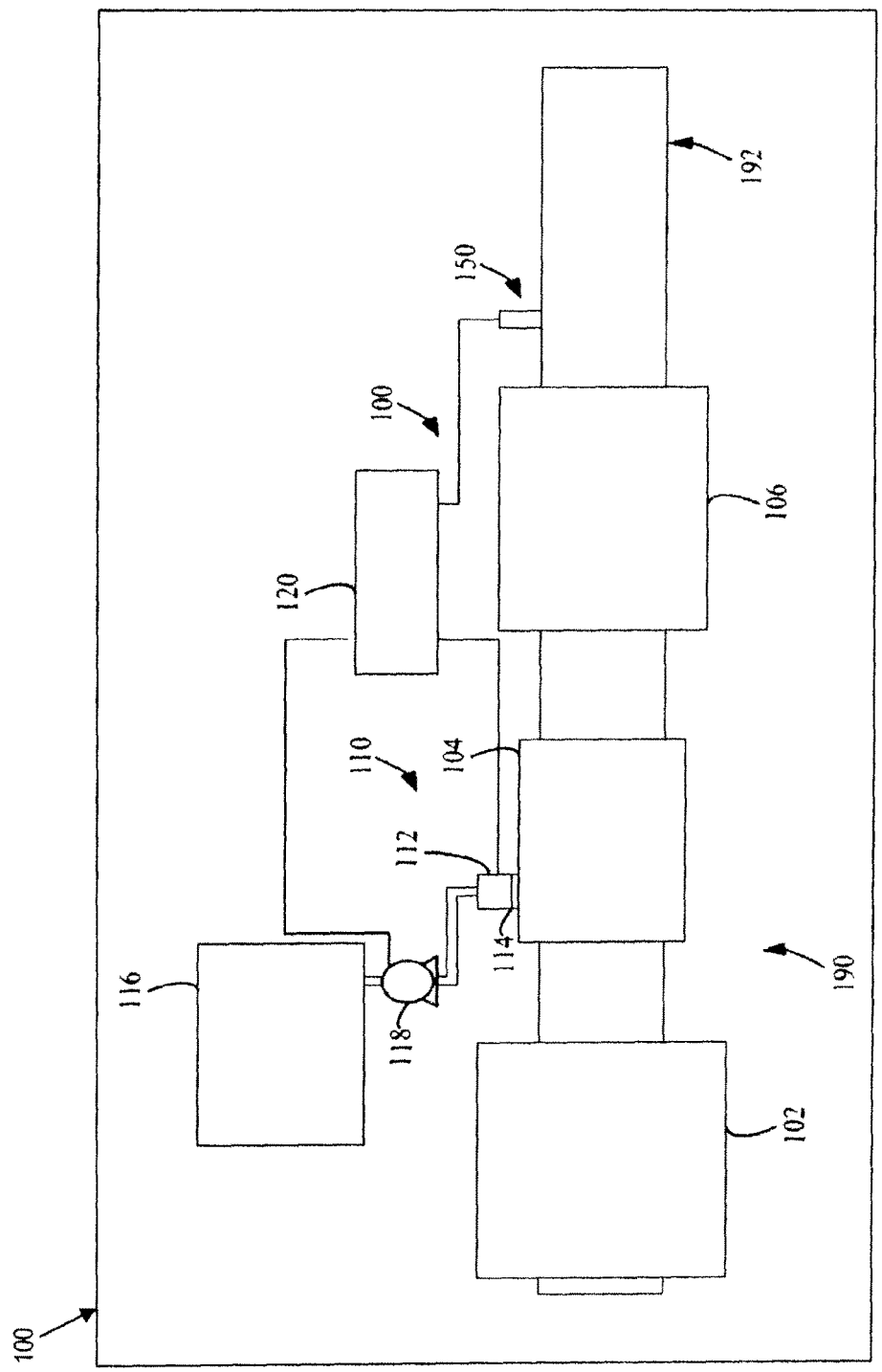
FIG. 1 is a block schematic diagram of an example aftertreatment system comprising an example reductant delivery system for an exhaust system.

FIG. 1 depicts an aftertreatment system 100 having an example reductant delivery system 110 for an exhaust system 190. The aftertreatment system 100 includes a particulate filter 102 (such as a diesel particulate filter (DPF)), the reductant delivery system 110, a decomposition chamber or reactor 104, a SCR catalyst 106, and a sensor 150.

The particulate filter 102 is configured to remove particulate matter, such as soot, from exhaust gas flowing in the exhaust system 190. The particulate filter 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes the reductant delivery system 110 having a dosing module 112 configured to dose the reductant into the decomposition chamber 104. In some implementations, the reductant is inserted upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the particulate filter 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 is used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst (e.g., a diesel oxidation catalyst (DOC)) in fluid communication with the exhaust system 190 (e.g., downstream of the SCR catalyst 106 or upstream of the particulate filter 102) to oxidize hydrocarbons and carbon monoxide in the exhaust gas.

In some implementations, the particulate filter 102 is positioned downstream of the decomposition chamber or reactor pipe 104. For instance, the particulate filter 102 and the SCR catalyst 106 may be combined into a single unit. In some implementations, the dosing module 112 may instead be positioned downstream of a turbocharger or upstream of a turbocharger.

The sensor 150 is coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the particulate filter 102, within the particulate filter 102, between the particulate filter 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

Figure 2A:
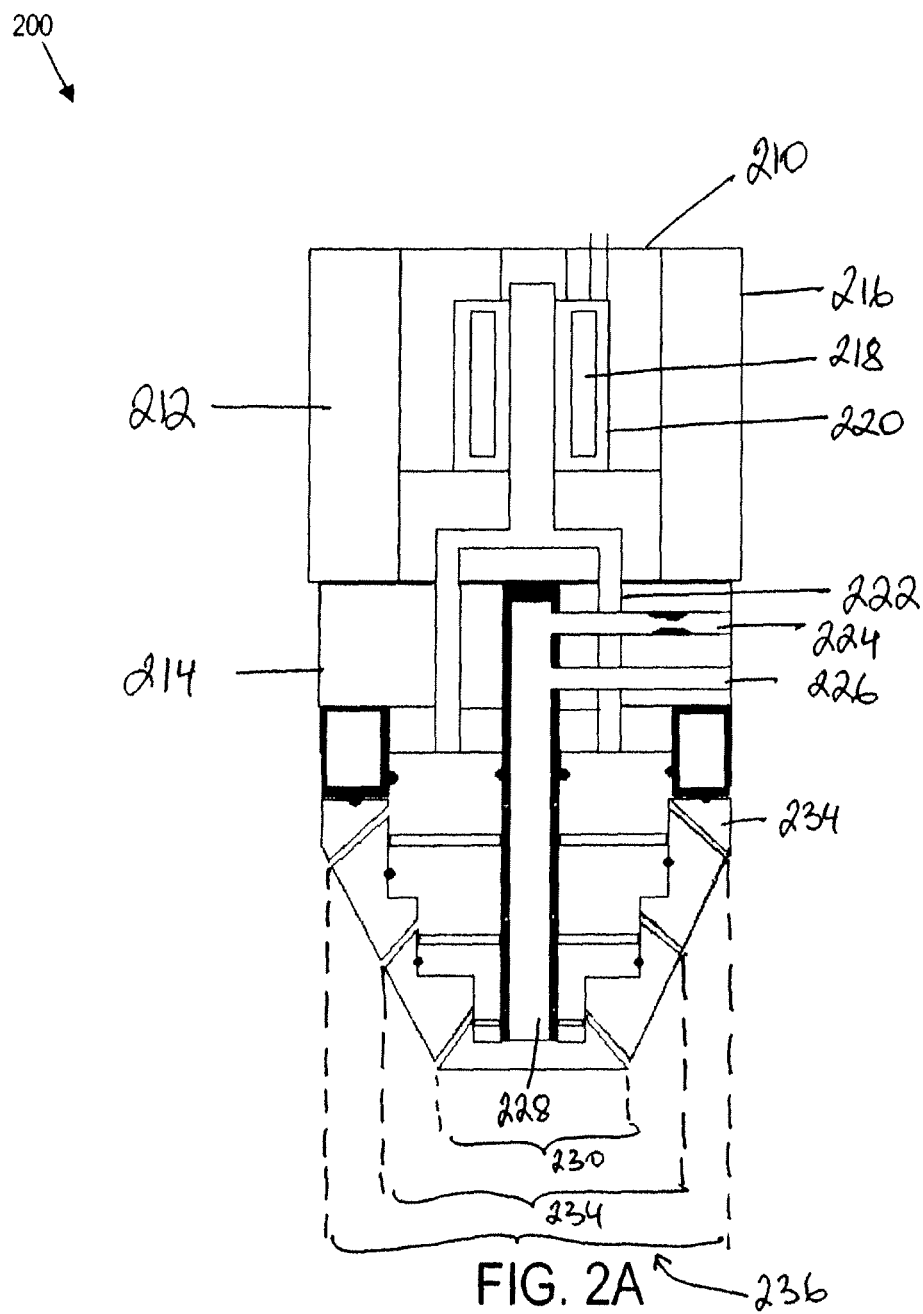
FIG. 2A is a schematic, cross-sectional view of an example assembly for reductant insertion comprising a variable spray angle nozzle in an example embodiment.

3. Implementations of Assembly and Methods for $NO_x$ Reducing Reagent Dosing with Variable Spray Angle Nozzle FIG. 2A depicts a schematic, cross-sectional view of an example assembly 200 for reductant insertion comprising a variable spray angle nozzle in an example embodiment. The assembly 200 depicted in FIG. 2A comprises a housing 210, which comprises a first segment 212 and a second segment 214. In certain implementations, the first segment 212 comprises an actuator encasement 216 such that an actuator is disposed within the housing 210. The second segment 214 comprises an outer shell 234, which, in some implementations, is monolithic with the housing 210.

The actuator is implemented as any suitable mechanism for placing the assembly 200 in a state for reductant delivery as described herein. For example, in some embodiments, the actuator is linear and may comprise a solenoid 218, an armature 220 and a plunger 222 shown in FIG. 2A. In other embodiments, the actuator may comprise a motor as shown, for example, in FIGS. 5-6. In yet other embodiments, the actuator is rotary and comprises a rotor and a stator positioned within the housing 210 as shown, for example, in FIGS. 5-6.

The assembly 200 further comprises a reductant outlet 224 and a reductant inlet 226. The reductant outlet 224 is fluidly coupled to the reductant inlet 226. In some implementations, the reductant outlet 224 is fluidly coupled to the reductant inlet 226 via a channel 228 defined by the outer shell 234 through the housing 210. In some implementations, the channel 228 is defined through the first segment 212 of the housing 210. In other implementations, the channel 228 is defined through the second segment 214 of the housing 210. In yet other implementations, the channel 228 is defined through both the first segment 212 and the second segment 214 of the housing 210.

The second segment 214 comprises a first array of reductant insertion ports 230 and a second array of reductant insertion ports 232. The first array of reductant insertion ports 230 and the second array of reductant insertion ports 232 may be arranged in separate levels. Thus, in some implementations, a first level includes the first array of reductant insertion ports 230 and a second level includes the second array of reductant insertion ports 232. In some implementations, the shape of the nozzle is stepped conical, and each step represents a respective level. In certain embodiments, each port in the first array of reductant insertion ports 230 is configured to deliver reductant at an angle that is different from the angle at which each port in the second array of reductant insertion ports 232 delivers the reductant. In some embodiments, the second segment comprises a third array of reductant insertion ports 236, arranged in yet another separate level and configured to deliver reductant at an angle that is different from one or both of the respective angles at which the first array of reductant insertion ports 230 the second array of reductant insertion ports 232 deliver the reductant. In some embodiments, each port in the first array of reductant insertion ports 230, the second array of reductant insertion ports 232, and the third array of reductant insertion ports 236 is configured to default to a closed position when the assembly 200 is in an inactive state and transition to an open position for reductant delivery to a reductant delivery region in an exhaust stream area of an aftertreatment system when the assembly 200 is in an active state. In some implementations, the first array of reductant insertion ports 230, the second array of reductant insertion ports 232, and the third array of reductant insertion ports 236 are defined by the outer shell 234.

In the arrangement depicted in FIG. 2A, the housing 210 of the assembly 200 is cylindrical such that the first segment 212 and the second segment 214, here considered to be inclusive of the outer shell 234, are approximately equal in inner diameter. Specifically, in some embodiments, the radius of a circular cross-section of the first segment 212, taken at any point of the first segment 212, is equal to the radius of a circular cross-section taken at any point of the second segment 214. In other embodiments, the length of each linear segment in a non-circular cross-section of the first segment 212, taken at any point of the first segment 212, is equal to the length of each corresponding linear segment in a non-circular cross-section taken at any point of the second segment 214.

In some implementations, the housing 210 of the assembly 200 is conical such that the second segment 214 of the housing 210 comprises a first tapered edge and a second edge, and the second segment 214 of the housing is fixedly coupled (monolithic) with the first segment 212 along the second edge. Specifically, in some embodiments, the radius of a circular cross-section of the first segment 212, taken at any point of the first segment 212, is larger than the radius of a circular cross-section taken at any point of the second segment 214. In other embodiments, the length of at least one of linear segment in a non-circular cross-section of the first segment 212, taken at any point of the first segment 212, is greater than the length of the corresponding linear segment in a non-circular cross-section taken at any point of the second segment 214. In yet other embodiments, the second segment 214 of the housing 210 is stepped conical.

Figure 2B:
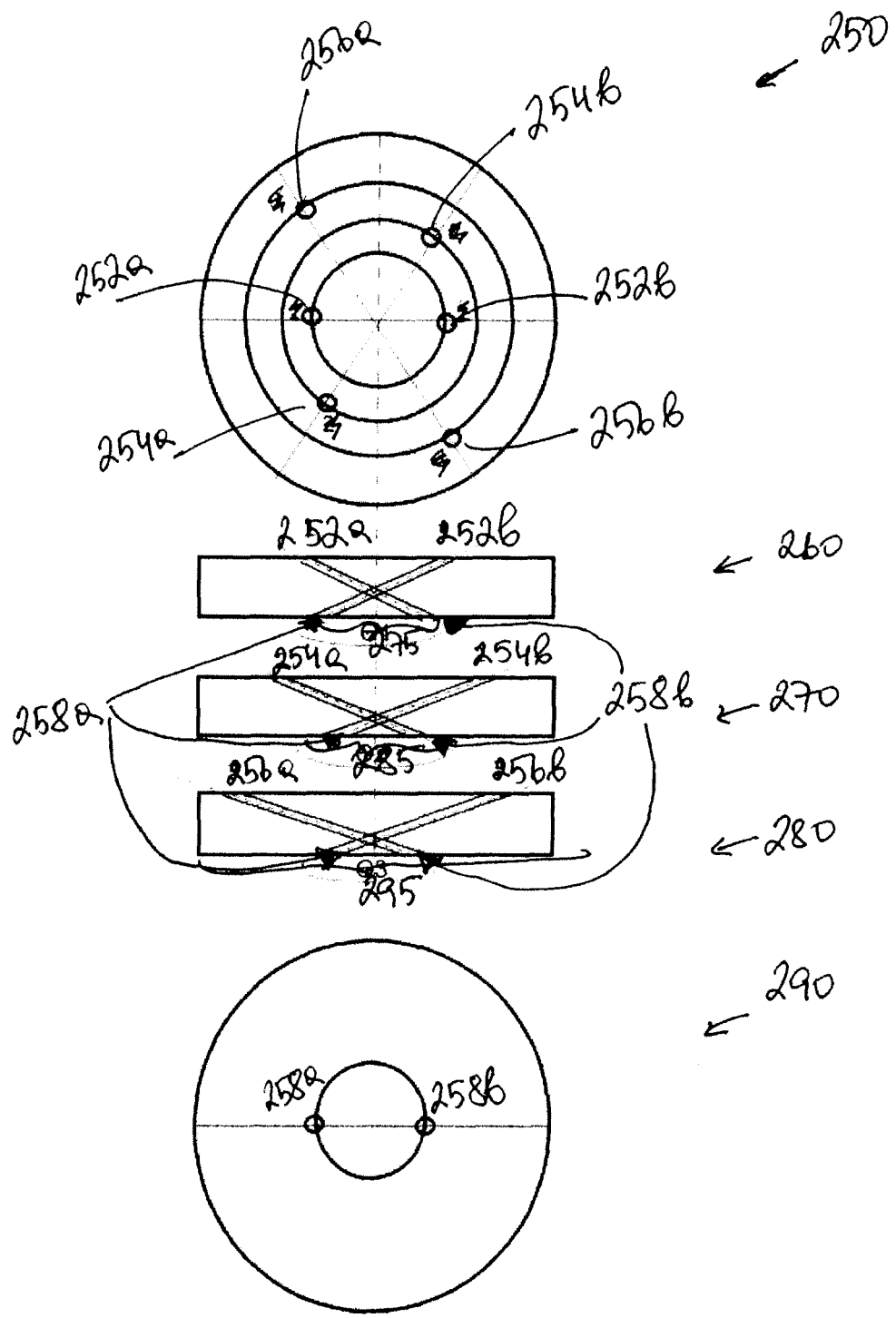
FIG. 2B depicts various modes of actuation of an apparatus for reductant insertion, such as discussed with reference to FIG. 2A, 5 and FIG. 6.
Figure 5:
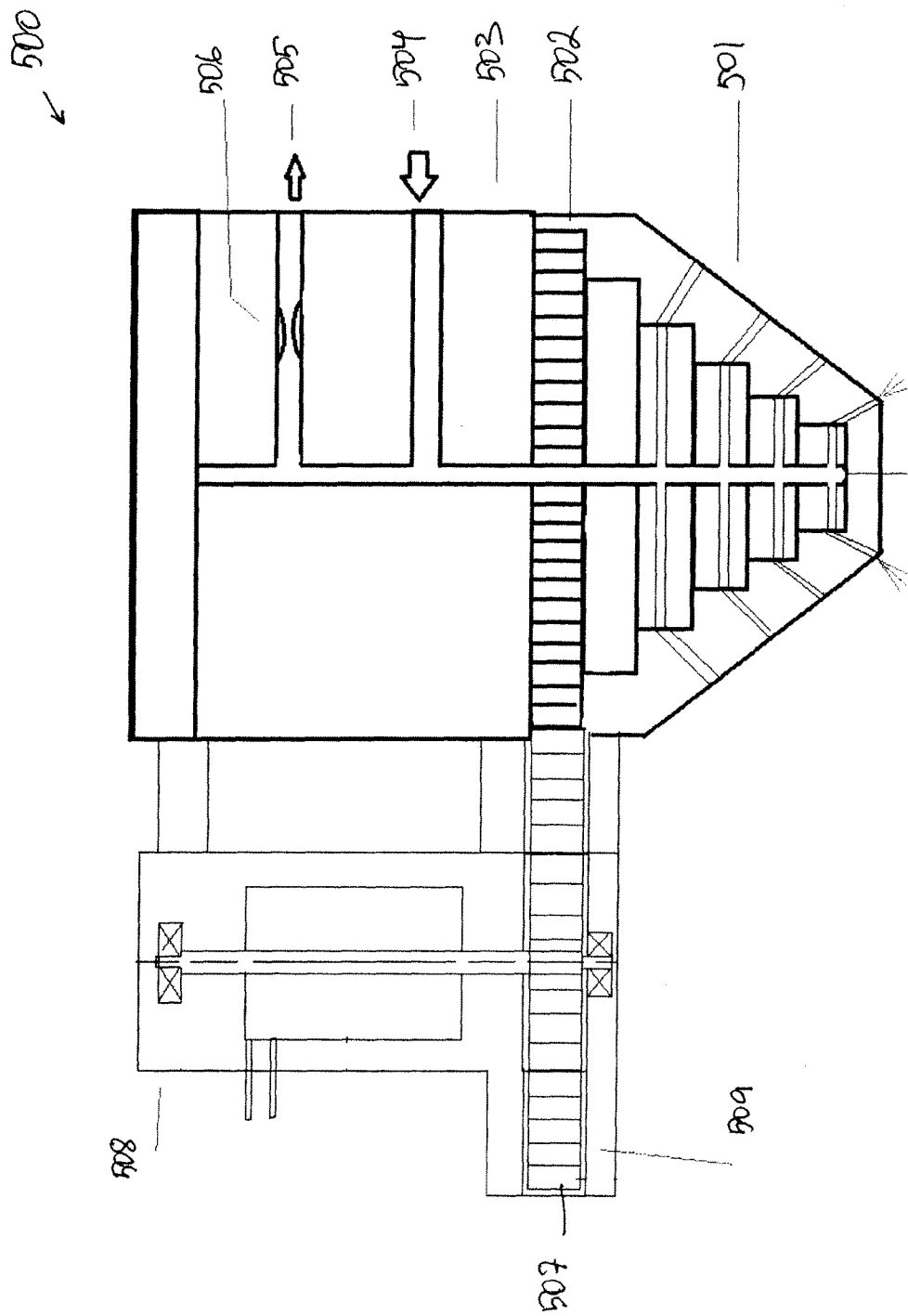
FIG. 5 depicts an example apparatus for reductant insertion with rotary actuation, according to an example embodiment.
Figure 6:
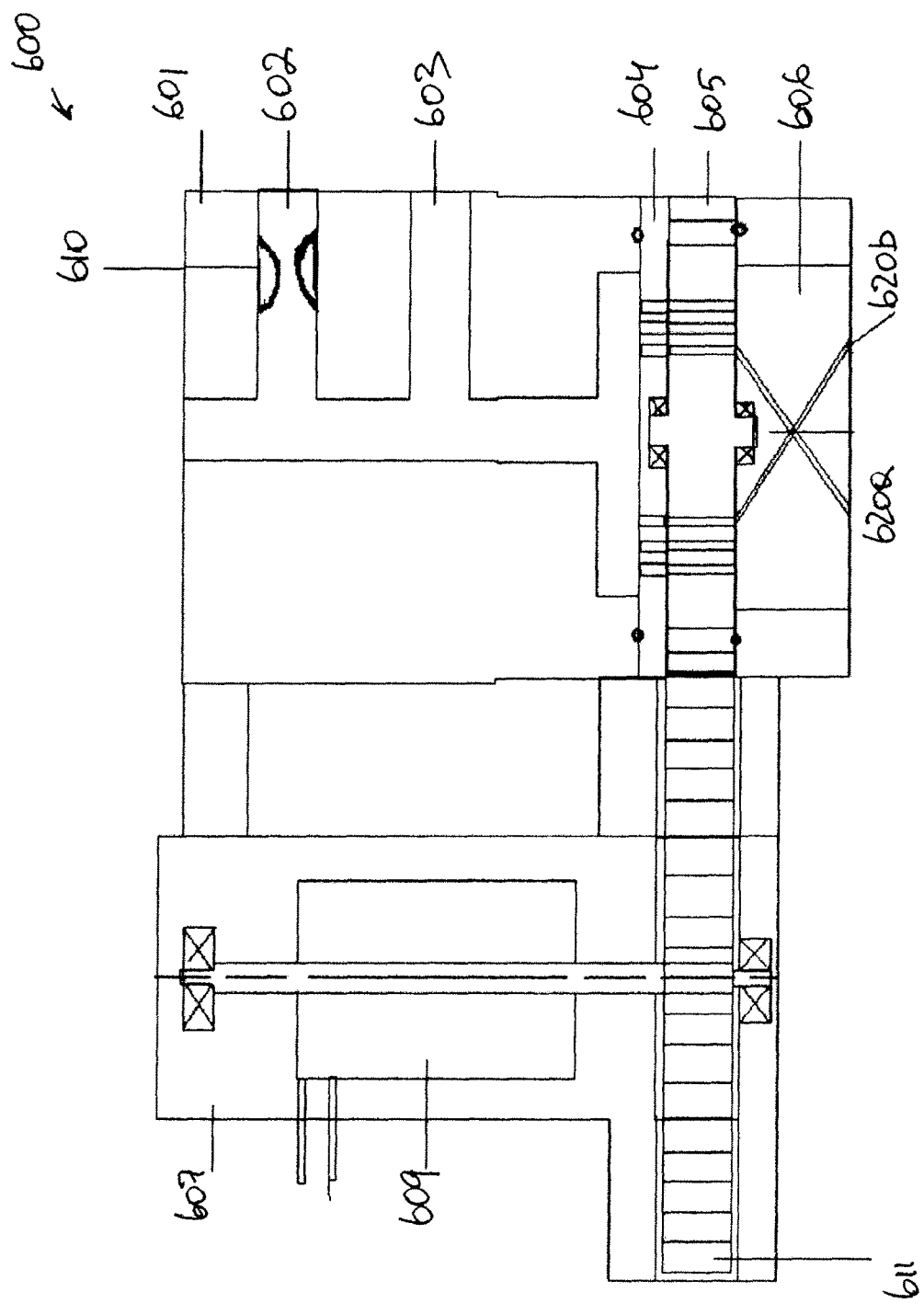
FIG. 6 depicts another example apparatus for reductant insertion with rotary actuation, according to an example embodiment.

FIG. 2B depicts certain example modes of actuation of an apparatus for reductant insertion, such as one discussed with respect to FIG. 2A, FIG. 5 and FIG. 6. As shown, the top view 250 depicts the apparatus 200 of FIG. 2, apparatus 500 of FIG. 5, or apparatus 600 of FIG. 6. Items 252a, 252b, 254a, 254b, 256a, and 256b represent three pairs of reductant insertion ports in, for example, a top plate, each pair of reductant insertion ports activated according to various configurations. The bottom view 290 depicts holes 258a and 258b. The configuration 260 shows the first pair of reductant insertion ports 252a and 252b in, for example, a bottom plate, the reductant insertion ports 252a and 252b being activated together as an array of reductant insertion ports 275. The configuration 270 shows the second pair of reductant insertion ports 254a and 254b being activated together as an array of reductant insertion ports 285. The configuration 280 shows the third pair of reductant insertion ports 256a and 256b being activated together as an array of reductant insertion ports 295. In some embodiments, a first channel is formed between any of the reductant insertion ports 252a, 254a, and 256a and the hole 285b, and a second channel is formed between any of the reductant insertion ports 252b, 254b, and 256b and the hole 285a, allowing the reductant to pass therethrough. In some embodiments, when a reductant insertion port is actuated, it delivers the reductant at an angle that is different from the angles of the remaining reductant insertion ports. The angle is relative to the center axis 258.

In some embodiments, each set of pairs of reductant insertion ports is positioned in different layers shown in FIG. 2A such that when one pair of reductant insertion ports is open, the remaining pairs of the reductant insertion ports are closed. In certain embodiments, the first pair of reductant insertion ports 252a and 252b comprise an inner array of reductant insertion ports in relation to the center 258 of the configuration as shown in top view, such that the inner array of reductant insertion ports is closest to the center 258 as compared to other reductant insertion ports. The second pair reductant insertion ports 254a and 254b comprise a middle array of reductant insertion ports in relation to the center 258 of the configuration as shown in top view. The third pair reductant insertion ports 256a and 256b comprise an outer array of reductant insertion ports in relation to the center 258 of the configuration as shown in top view, such that the outer array of reductant insertion ports is furthest from the center 258 as compared to other reductant insertion ports. In such embodiments, the reductant insertion ports 252a, 252b, 254a, 254b, 256a, and 256b are matched (arranged in pairs) radially, such that they are approximately equidistant from the center point 258. In certain embodiments, reductant insertion ports 252a, 252b, 254a, 254b, 256a, and 256b are matched axially, such that an approximately straight line runs through both of the reductant insertion ports and the center point 258. In some embodiments, when one array is open, other arrays of reductant insertion ports remain closed, such that only one array of reductant insertion ports is activated at a time. When the assembly 200 is not actuated, all arrays of reductant insertion ports are closed.

Figure 3:
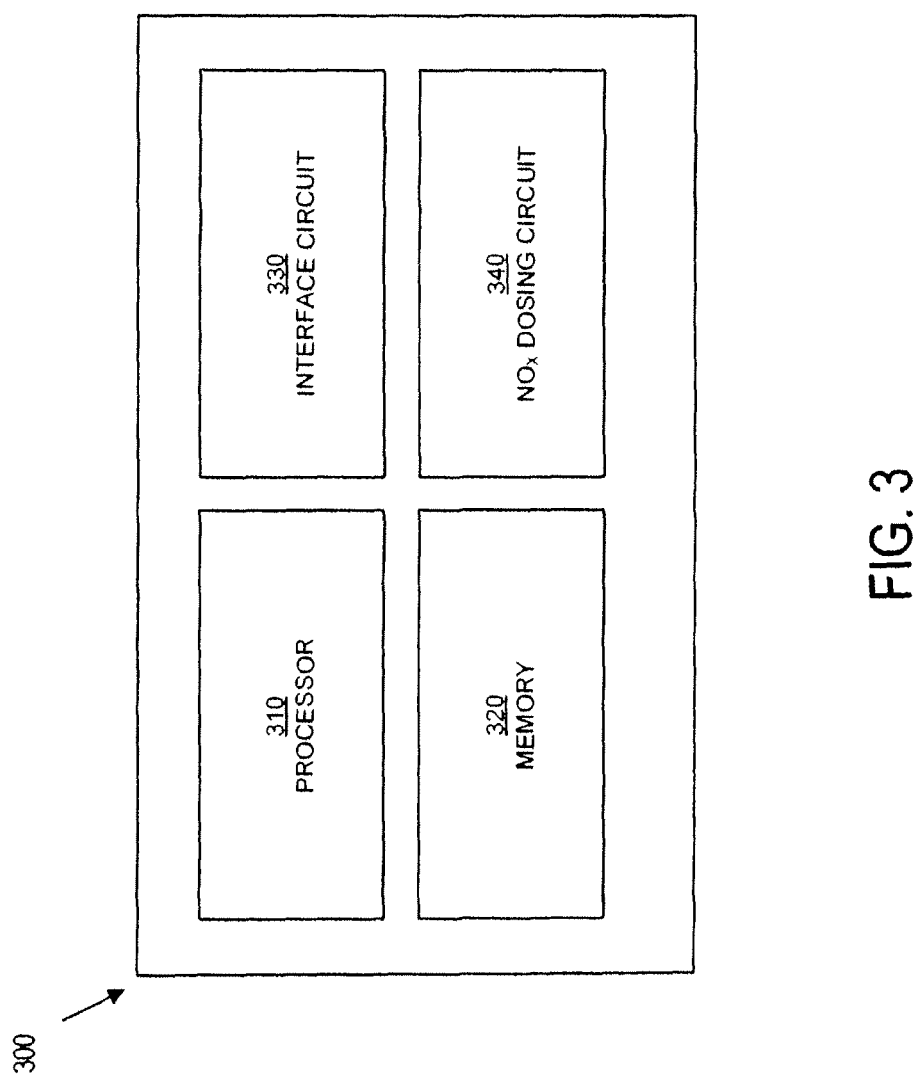
FIG. 3 is a schematic block diagram of a reductant dosing controller in an example embodiment, the example reductant dosing controller comprising at least one processor, a memory, an interface circuit, and an $NO_x$ dosing circuit.

FIG. 3 depicts a schematic block diagram of a reductant dosing controller 300 in an example embodiment, the example reductant dosing controller 300 comprising at least one processor 310, a memory 320, an interface circuit 330, and a $NO_x$ dosing circuit 340. The reductant dosing controller 300 is configured as described in reference to FIG. 4.

Figure 4:
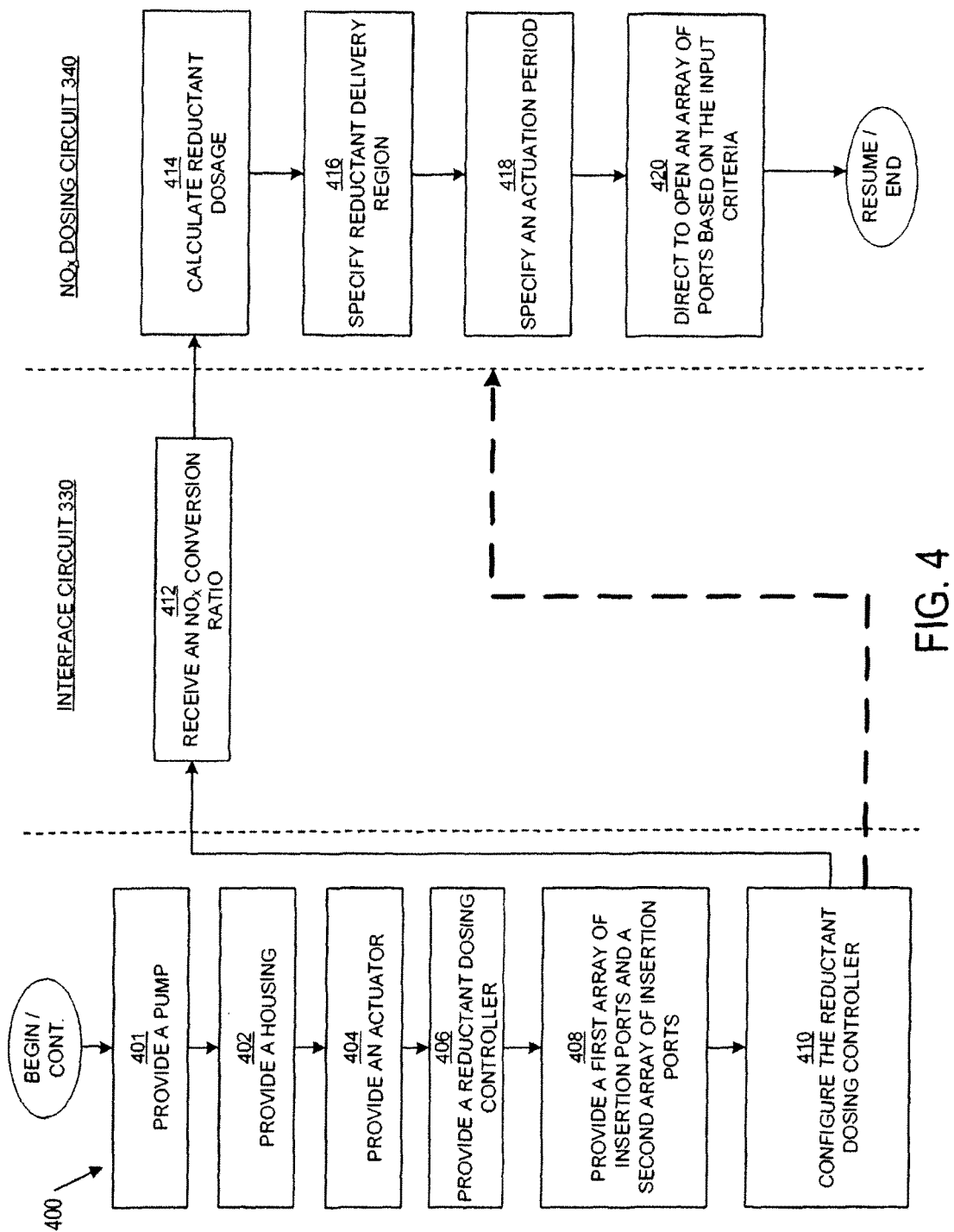
FIG. 4 depicts an example method of delivering $NO_x$ reductant in a reductant insertion assembly according to a particular embodiment.

FIG. 4 depicts an example method of delivering $NO_x$ reductant in a reductant insertion assembly according to a particular embodiment. At 401, a pump is provided. At 402, a housing (e.g., housing 210 of FIG. 1) is provided. At 404, an actuator is provided and positioned within the housing. At 406, a reductant dosing controller (e.g., reductant dosing controller 300) is provided.

At 412, a specified $NO_x$ conversion ratio is received by the interface circuit 330 of the reductant dosing controller. In some embodiments, the $NO_x$ dosing circuit 340 of the reductant dosing controller 300 is configured to calculate, based at least on the $NO_x$ conversion ratio, a reductant dosage (at 414), specify a reductant delivery region in a diesel engine exhaust stream area of an aftertreatment system (at 416), specify an actuation period (at 418), and based at least on the reductant delivery region and the actuation period, direct the assembly 200 to open one of the first array of reductant insertion ports 230 and the second array of reductant insertion ports 232 (at 420). In some embodiments, the controller (shown at 300) controls the pump 116 for constant flow of reductant during the actuation and non-actuation periods.

In some embodiments, the NO$_x$ dosing circuit 340 is further configured to effectuate rotary actuation of the assembly 200 by directing the assembly 200 to engage a rotor positioned on a stationary perforated plate within the housing 210 of assembly 200.

In some embodiments, the NO$_x$ dosing circuit 340 is further configured to, based at least on the reductant delivery region and the actuation period, calculate a first path along a first spray pathway, comprising selecting the first spray pathway from a plurality of first array pathways that fluidly connect a first reductant insertion port in the first array of reductant insertion ports 230 and the channel 228. The NO$_x$ dosing circuit 340 is further configured to, based at least on the reductant delivery region and the actuation period, calculate a second path along a second spray pathway, comprising selecting the second spray pathway from a plurality of second array pathways that fluidly connect a second reductant insertion port in the second array of reductant insertion ports and the channel.

In some embodiments, the first path and the second path are defined by the NO$_x$ dosing circuit such that the first path and the second path are each positioned on a plane comprising a longitudinal axis of the housing such that a first angle, formed by the first path and the longitudinal axis, is different from a second angle formed by the second path and the longitudinal axis. Thus, one may specify different spray angles to precisely target a specified coverage area.

In some embodiments, the NO$_x$ dosing circuit 340 is further configured to define multiple delivery regions and multiple corresponding arrangements and activate the arrangements at different points in time. One such arrangement may comprise at least a path and a performance parameter. The path is defined by the NO$_x$ dosing circuit 340 to effectuate the following: (1) the path is calculated, (2) injection/insertion ports located along the path are opened, and (3) reductant is delivered. The performance parameter, used by the NO$_x$ dosing circuit 340 to define an arrangement, may comprise the following in any suitable combination: a value representing a specified spray cone angle, reductant flow velocity, or reductant flow pressure. A non-exclusive list of configurable characteristics of the assembly 200 is presented below. Under the Low Exhaust Gas Flow Rate Condition of an example implementation, large reductant spray angle with low flow rate, short penetration depth and low velocity help effectuate better mixing with low flow velocity and low density exhaust gas. Under the High Exhaust Gas Flow Rate Condition of another example implementation, small reductant spray angle with high flow rate, long penetration depth and high velocity help effectuate better mixing with high flow velocity and high density exhaust gas.

| Performance Parameter | Low Exhaust Gas Flow Rate Condition (Low speed, low density) | High Exhaust Gas Flow Rate Condition (High speed, high density) | Configurable Characteristics |
|---|---|---|---|
| Spray Cone Angle | Large | Small | Angle of insertion ports |
| Penetration Depth | Short | Long | Diameter of insertion ports |
| Flow Rate | Low | High | Number of insertion ports, opening time |
| Flow Velocity | Low | High | Diameter of insertion ports |
| Pressure | Low | High | P sensor, Pump control |
| Spray Density | Low | High | A combination of the above |

FIG. 5-6 depict additional example embodiments with various modes of rotary actuation. FIG. 5 depicts an example apparatus 500 for reductant insertion with rotary actuation, according to an example embodiment. The apparatus 500 comprises a reductant housing 503, which has a reductant inlet 504 and a reductant outlet 505. In some embodiments, the orifice 506 allows for the maintaining of the pressure needed for insertion of reductant. In certain embodiments, the rotor 502 is operated by a gear mechanism 507. In some embodiments, rotary actuation is part of an arrangement comprising a stationary perforated plate, such as one described with reference to FIG. 6, positioned within the housing of the apparatus 500 such that the rotor 502 is positioned on the stationary perforated plate. In some embodiments, the actuator is operated by the reductant dosing controller 300, shown in FIG. 3, such that the reductant dosing controller 300 effectuates rotary actuation of the assembly 500 by engaging the rotor 502. The apparatus 500 may further comprise a stator 501, which has holes that correspond to mating holes of the rotor 502. The structure may further comprise a motor 508 positioned in the housing 509. The housing 509 may also house a gear mechanism.

FIG. 6 depicts another example apparatus 600 for reductant insertion with rotary actuation, according to an example embodiment. The apparatus 600 comprises a steel housing 601, which has a reductant inlet 602 and a reductant outlet 603. The orifice 610 allows for the maintaining of the pressure needed for insertion of reductant. In some embodiments, the housing further includes a set of plates, including a top plate 604, a rotor plate 605 and a nozzle plate 606. In some embodiments, the top plate 604 is positioned adjacent to and atop the rotor plate 605, which provides support to a rotary actuation mechanism, such as one described in reference to FIG. 5. The top plate 604 supports the rotor plate 605 by housing the bearing. The top plate 604 also guides the reductant flow through holes towards the rotor plate 605. The rotor plate may be fixedly or removably coupled to the housing 601. The nozzle plate 606 is a three-dimensional structure that defines holes 620a and 620b. The apparatus 600 is activated via a drive gear 611, which is activated by a motor 609. The motor 609 is positioned in the motor housing 607 and may be an electric motor.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC.

The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

As utilized herein, the terms "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The term "coupled" and the like as used herein means the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A nozzle of a reductant insertion assembly in an exhaust aftertreatment system, the nozzle comprising:
    a central channel; and
    an outer shell including an outer surface having a shape of a truncated cone, the outer shell comprising a first array of reductant insertion ports configured to be fluidly connected to the central channel and a second array of reductant insertion ports configured to be fluidly connected to the central channel;
    wherein each of the reductant insertion ports of the first array includes a first opening and is configured to insert reductant from the nozzle at a first angle, and each of the reductant insertion ports of the second array includes a second opening and is configured to insert the reductant from the nozzle at a second angle that is different from the first angle; and
    wherein the openings of the first array of reductant insertion ports are arrayed around the outer surface of the outer shell at a first axial location along the outer shell, and the openings of the second array of reductant insertion ports are arrayed around the outer surface of the outer shell at a second axial location along the outer shell that is different from the first axial location.

2. The nozzle of claim 1, wherein a first diameter of at least one first port of the first array of reductant insertion ports is different from a second diameter of at least one second port of the second array of reductant insertion ports.

3. The nozzle of claim 1, wherein the nozzle comprises a housing comprising:
    a first segment,
    a second segment comprising the outer shell,
    a reductant inlet, and
    a reductant outlet fluidly coupled to the reductant inlet via the central channel;
    wherein the first segment and the second segment are equal in inner diameter.

4. The nozzle of claim 3, wherein the second segment of the housing comprises a first tapered edge and a second edge, and wherein the second segment of the cylindrical housing is fixedly coupled to the first segment along the second edge.

5. A reductant insertion assembly, comprising:
    a nozzle comprising:
        a central channel, and
        an outer shell including an outer surface, the outer shell comprising a first array of reductant insertion ports configured to be fluidly connected to the central channel and a second array of reductant insertion ports configured to be fluidly connected to the central channel, wherein each of the reductant insertion ports of the first array includes a first opening and is configured to insert reductant from the nozzle at a first angle, and each of the reductant insertion ports of the second array includes a second opening and is configured to insert the reductant from the nozzle at a second angle that is different from the first angle;

a central member located between the central channel and the outer shell, the central member comprising a first array of connecting channels and a second array of connecting channels; and an actuator that is controllable to cause the central member to move to (i) a first position, at which the first array of connecting channels is aligned with the first array of reductant insertion ports and reductant is insertable by the first array of reductant insertion ports, but the second array of connecting channels is not aligned with the second array of reductant insertion ports, and (ii) a second position, at which the second array of connecting channels is aligned with the second array of reductant insertion ports and reductant is insertable by the second array of reductant insertion ports, but the first array of connecting channels is not aligned with the first array of reductant insertion ports.

6. The reductant insertion assembly of claim 5, wherein the actuator is a rotary actuator.

7. The reductant insertion assembly of claim 5, further comprising a reductant dosing controller configured to:
access a $NO_x$ conversion ratio;
calculate, based at least on the $NO_x$ conversion ratio, a reductant dosage;
specify a reductant delivery region in a diesel engine exhaust stream area of an aftertreatment system;
specify an actuation period; and
based at least on the reductant delivery region and the actuation period, control the actuator to open one of the first array of reductant insertion ports and the second array of reductant insertion ports.

8. The reductant insertion assembly of claim 7, wherein the controller is further configured to define the reductant delivery region based on an electronic signal value encoding a performance parameter.

9. The reductant insertion assembly of claim 8, wherein the controller is further configured to:
receive the performance parameter comprising a value representing a reductant flow pressure;
receive a pressure sensor input value from a pressure sensor disposed within a housing of the reductant dosing system; and
calculate the reductant delivery region based at least on the reductant flow pressure and the pressure sensor input value.

* * * * *